(12) United States Patent
Wilson et al.

(10) Patent No.: US 7,282,287 B2
(45) Date of Patent: Oct. 16, 2007

(54) PURGING WATER WITH REACTANT AIR PUMP POWERED BY OPERATIONAL FUEL CELL SYSTEM DURING SHUTDOWN

(75) Inventors: Matthew P. Wilson, Groton, CT (US); Harold T. Couch, Simsbury, CT (US); Gennady Resnick, South Windsor, CT (US)

(73) Assignee: UTC Power Corporation, South Windsor, CT (US)

( * ) Notice: Subject to any disclaimer, the term of this patent is extended or adjusted under 35 U.S.C. 154(b) by 0 days.

(21) Appl. No.: 10/996,512

(22) Filed: Nov. 24, 2004

(65) Prior Publication Data

US 2006/0110641 A1    May 25, 2006

(51) Int. Cl.
*H01M 8/04* (2006.01)
(52) U.S. Cl. .......................................... 429/13; 429/26
(58) Field of Classification Search ................. 429/13, 429/39, 22, 34, 38
See application file for complete search history.

(56) References Cited

U.S. PATENT DOCUMENTS

| | | | |
|---|---|---|---|
| 6,479,117 B1 * | 11/2002 | Phillips et al. | 428/40.1 |
| 6,479,177 B1 * | 11/2002 | Roberts et al. | 429/13 |
| 6,534,210 B2 * | 3/2003 | Luken et al. | 429/13 |
| 2004/0142217 A1 * | 7/2004 | Couch et al. | 429/13 |
| 2005/0186454 A1 * | 8/2005 | Clingerman et al. | 429/13 |

* cited by examiner

*Primary Examiner*—Susy Tsang-Foster
*Assistant Examiner*—Ben Lewis
(74) *Attorney, Agent, or Firm*—M. P. Williams

(57) ABSTRACT

The air blower (18) of a fuel cell power plant (9) is used to force water out of the coolant flow fields (27) of a fuel cell stack (10), a coolant pump (35) and a heat exchanger (40) through a valve (46) which is closed during normal operation. The water removal occurs as part of a shutdown procedure in which the fuel cell stack continues to operate so that it provides the power for the air pump and to assist in water removal (such as retaining low vapor pressure). The water flow to an accumulator (33) is blocked by a valve (29) during the shutdown procedure.

1 Claim, 1 Drawing Sheet

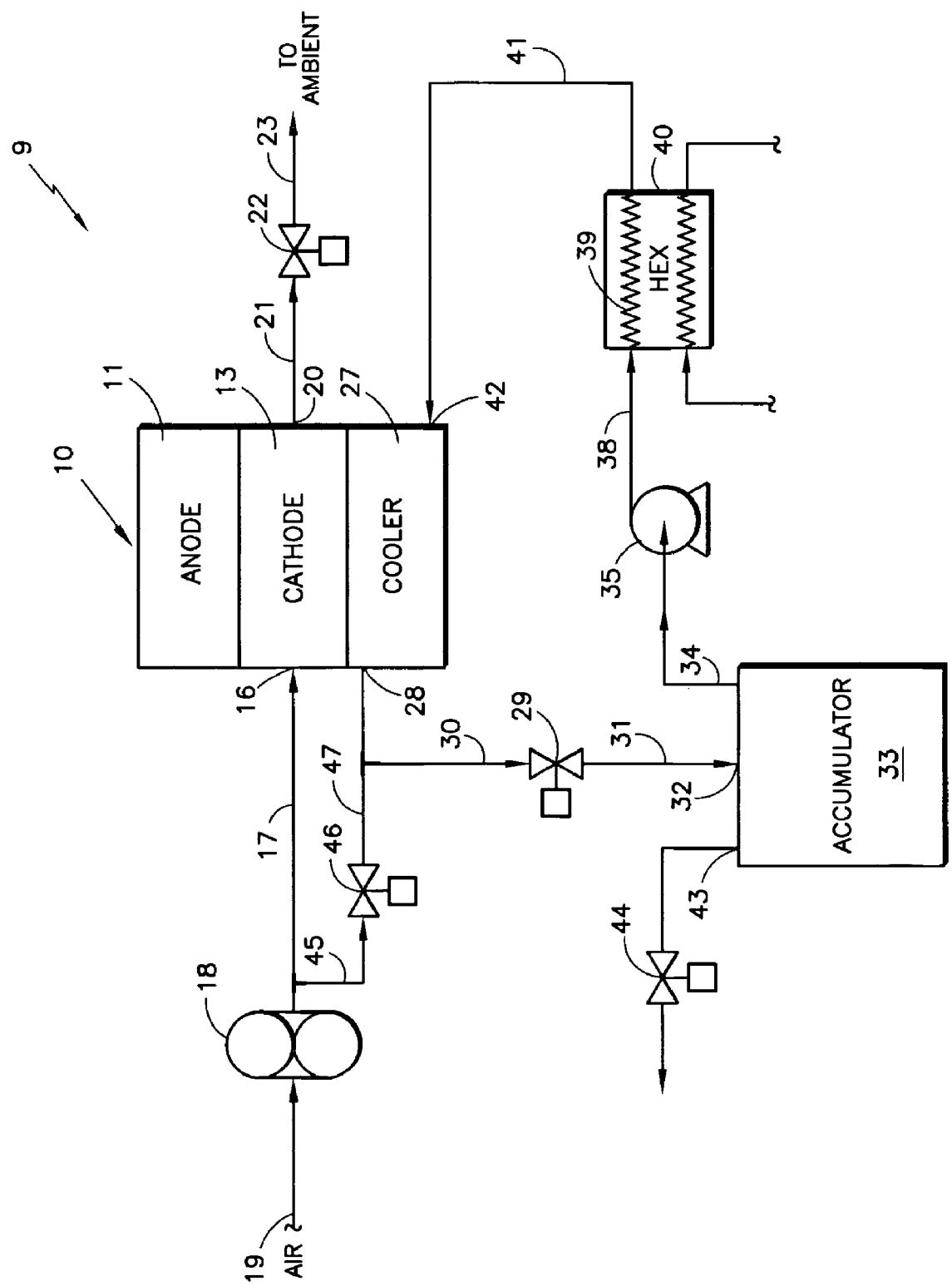

PURGING WATER WITH REACTANT AIR PUMP POWERED BY OPERATIONAL FUEL CELL SYSTEM DURING SHUTDOWN

This invention was made with the Government support under Agreement No. DTRS56-99-T-0015 awarded by the U.S. Department of Transportation, RSPA. The Goverment may have certain rights to this invention.

TECHNICAL FIELD

This invention relates to using the reactant air pump of a fuel cell power plant to force water out of coolant fields, coolant passageways and coolant equipment, as part of a shutdown procedure, utilizing power generated by the fuel cell power plant while it is still operational, just prior to shutdown.

BACKGROUND ART

Damage can occur to fuel cell power plant components as a result of water freezing, whenever a fuel cell power plant is to be non-operational in an ambient environment in subfreezing temperatures. It is known to have an accumulator placed at the lowest point in the coolant system so that freezable coolant that actually flows through the fuel cell stack can drain toward the accumulator. It is also known to use external pumps to blow air or inert gas through various parts of the system in order to purge water therefrom.

However, use of an external pump increases the cost, size, weight and complexity of a fuel cell power plant and may be prohibitive in fuel cell power plants used to power electric vehicles. In addition, when the fuel cell power plant is shut down, an auxiliary power source, such as batteries or supercapacitors, must be utilized in order to power the purging pump equipment. This either reduces auxiliary power available for various functions, such as melting of ice or warming of the fuel cell stack, or else requires larger, heavier and more expensive auxiliary power sources, which also may be prohibitive in electric vehicles.

DISCLOSURE OF INVENTION

Objects of the invention include: purging water from coolant channels, passages and equipment without the use of either an auxiliary purge pump or auxiliary power; purging coolant water from a fuel cell power plant without requiring additional expense, weight or space for auxiliary pumping equipment or auxiliary power; and improved purging of water from a fuel cell power plant in anticipation of subfreezing temperatures.

According to the present invention, the reactant air pump of a fuel cell power plant is utilized to purge water from water coolant flow fields, coolant passages and coolant equipment, utilizing fuel cell power plant power while the fuel cell power plant is still operational, during shutdown of the fuel cell power plant in anticipation of being non-operational at subfreezing temperatures.

In accordance with the invention, coolant water is blown out of the coolant flow fields, coolant pump, and a coolant heat exchanger by the air pump using power generated by the fuel cell power plant.

The invention is disclosed in a simple embodiment but is equally applicable to coolant systems operating with different pump arrangements, including arrangements having a primary pump and a secondary pump utilized to educt froth from an air separator.

Other objects, features and advantages of the present invention will become more apparent in the light of the following detailed description of exemplary embodiments thereof, as illustrated in the accompanying drawing.

BRIEF DESCRIPTION OF THE DRAWINGS

The sole FIGURE is a simplified, schematized, block diagram of a fuel cell power plant employing the invention.

MODE(S) FOR CARRYING OUT THE INVENTION

Referring to the FIGURE, a fuel cell power plant 9 employing the invention includes a fuel cell stack 10 which may be a conventional polymer electrolyte proton exchange membrane (PEM) fuel cell stack, including conventional anode flow fields 11, the configuration and nature of which are not peculiar to the present invention and need not be described further.

The stack 10 includes cathode flow fields 13 which provide oxidant gas to the cathode catalyst. The cathode flow fields are provided air at an inlet 16 through a conduit 17 from an air pump 18, receiving air through a conduit 19 from ambient. The exit 20 of the cathode flow fields is exhausted through a conduit 21 and a valve 22 to ambient 23.

The stack 10 has coolant flow fields 27, the exit 28 of which is connected through a valve 29 and conduits 30, 31 to the inlet 32 of a conventional accumulator 33. From the accumulator, coolant flows through a conduit 34, a coolant pump 35, over a conduit 38 and through the primary flow passage 39 of a heat exchanger 40, and thence through a conduit 41 into the inlet 42 of the coolant flow fields 27. The heat exchanger 40 is conventional, the details of it are not important to the invention and it is not described further. The accumulator may have an outlet 43 through a valve 44.

In accordance with the invention, air from the conduit 17 is applied, during shutdown, through a conduit 45, a valve 46 and a conduit 47 to the coolant flow field exit 28. During normal operation, the valve 46 is closed, the valve 29 is open, and the pump 35 is operational.

During shutdown, the pump 35 is off, the valve 29 is closed and the valve 46 is open. However, the fuel cell power plant 9 is still producing electricity, at least of sufficient magnitude so as to provide full power to the air pump 18. This is a first aspect of the present invention. The fuel cell power plant operation may be regulated during shutdown, such as by means of a controller and an auxiliary load.

Maintaining the operation of the fuel cell power plant 9 without coolant flow may cause the temperature of the stack 10 to increase above the normal operating temperature, to about 65° C.-80° C., for instance. The temperature rise results in an increase in vapor pressure of the water remaining in the coolant flow channels as the air passes through the coolant flow fields, thereby assisting in dryout of the coolant flow fields. This shutdown process may last for between a fraction of a minute and several minutes, depending on the system configuration and size of the conduits and channels.

During shutdown, the primary flow of air is over the conduit 45 through the now-open valve 46, over the conduit 47 and backwardly through the exit 28 of the coolant flow fields 27. From the inlet 42 of the coolant flow fields, water which is blown ahead of the air, and moisture which is picked up by the air, will flow over the conduit 41, through the heat exchanger 40, and over the conduit 38, backwardly through the coolant pump 35 and over the conduit 34 into the accumulator 33.

The air pump 18 may be a positive displacement pump, or any other suitable pump which can provide sufficient pressure and flow volume to clear water from the coolant flow fields 27, the heat exchanger 40, and the coolant pump 35, while at the same time providing sufficient process air to the cathode flow fields for generating the required pump power.

The invention may be used to clear water from less than all of the water passages in a fuel cell power plant, if desired.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of operating a fuel cell power plant having a plurality of fuel cells arranged in a stack including coolant flow fields, said fuel cells including oxidant reactant gas flow fields, said method comprising:

as part of a procedure of shutting down the operation of said stack of fuel cells, while said stack of fuel cells is still producing electrical power, utilizing at least a portion of said electrical power generated by said stack of fuel cells to operate an air pump that provides, during normal operation, air to said oxidant reactant gas flow fields of the fuel cells in said stack, and connecting said air pump to water passages comprising at least one of (a) the coolant flow fields in said fuel cell stack, (b) a coolant pump that during normal operation causes coolant to flow through said coolant flow fields, and (c) the primary flow passage of a coolant heat exchanger interconnected with said coolant flow fields.

* * * * *